United States Patent
Morrison

(10) Patent No.: US 10,278,503 B1
(45) Date of Patent: May 7, 2019

(54) VEHICLE-MOUNTED ARTIST EASEL

(71) Applicant: Leeford Morrison, Laurelton, NY (US)

(72) Inventor: Leeford Morrison, Laurelton, NY (US)

( * ) Notice: Subject to any disclaimer, the term of this patent is extended or adjusted under 35 U.S.C. 154(b) by 0 days.

(21) Appl. No.: 15/889,345

(22) Filed: Feb. 6, 2018

(51) Int. Cl.
*F16M 11/00* (2006.01)
*A47B 97/04* (2006.01)
*B60R 9/02* (2006.01)

(52) U.S. Cl.
CPC ............. *A47B 97/04* (2013.01); *B60R 9/02* (2013.01)

(58) Field of Classification Search
CPC ........ A47B 97/04; F16M 13/04; A01M 31/02
See application file for complete search history.

(56) References Cited

U.S. PATENT DOCUMENTS

| | | | |
|---|---|---|---|
| 3,934,769 A * | 1/1976 | Carlson, Jr. | F16M 13/04 224/185 |
| 4,239,170 A | 12/1980 | Planebo | |
| 5,791,623 A | 8/1998 | Louridas | |
| 5,950,979 A | 9/1999 | Mira | |
| 6,086,031 A * | 7/2000 | Renfro | A01M 31/02 182/187 |
| 6,601,805 B1 | 8/2003 | Kapp | |
| 8,177,183 B2 | 5/2012 | Reinen | |
| 8,534,627 B2 | 9/2013 | Kressin | |
| 8,870,148 B2 * | 10/2014 | Hickman | A47B 97/04 211/119.004 |
| D750,908 S | 3/2016 | Hickman | |

FOREIGN PATENT DOCUMENTS

WO      2014158313 A     1/2015

* cited by examiner

Primary Examiner — Amy J. Sterling
(74) Attorney, Agent, or Firm — Kyle A. Fletcher, Esq.

(57) ABSTRACT

The vehicle-mounted artist easel may be hung on an open door of a vehicle using hooks on the top of the left and right mounting armatures. Padding on the hooks and bumpers on the bottoms of the left and right mounting armatures prevent scratches to the open door. Bottom and top canvas holders may be positioned on the mast to match the height of the canvas and the canvas may be clamped to the vehicle-mounted artist easel using the bottom and top canvas holders. The artist may paint a picture using the vehicle as an easel to support the canvas.

17 Claims, 4 Drawing Sheets

VEHICLE-MOUNTED ARTIST EASEL

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of artist equipment, more specifically, a vehicle-mounted artist easel.

SUMMARY OF INVENTION

The vehicle-mounted artist easel may be hung on an open door of a vehicle using hooks on the top of the left and right mounting armatures. Padding on the hooks and bumpers on the bottoms of the left and right mounting armatures prevent scratches to the open door. Bottom and top canvas holders may be positioned on the mast to match the height of the canvas and the canvas may be clamped to the vehicle-mounted artist easel using the bottom and top canvas holders. The artist may paint a picture using the vehicle as an easel to support the canvas.

An object of the invention is to provide an easel that mounts to an open door of a vehicle.

Another object of the invention is to provide an artist easel that adjusts for multiple sizes of canvas.

A further object of the invention is to padding an bumpers to prevent scratching of the open door of the vehicle.

These together with additional objects, features and advantages of the vehicle-mounted artist easel will be readily apparent to those of ordinary skill in the art upon reading the following detailed description of the presently preferred, but nonetheless illustrative, embodiments when taken in conjunction with the accompanying drawings.

In this respect, before explaining the current embodiments of the vehicle-mounted artist easel in detail, it is to be understood that the vehicle-mounted artist easel is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the vehicle-mounted artist easel.

It is therefore important that the claims be regarded as including such equivalent construction insofar as they do not depart from the spirit and scope of the vehicle-mounted artist easel. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
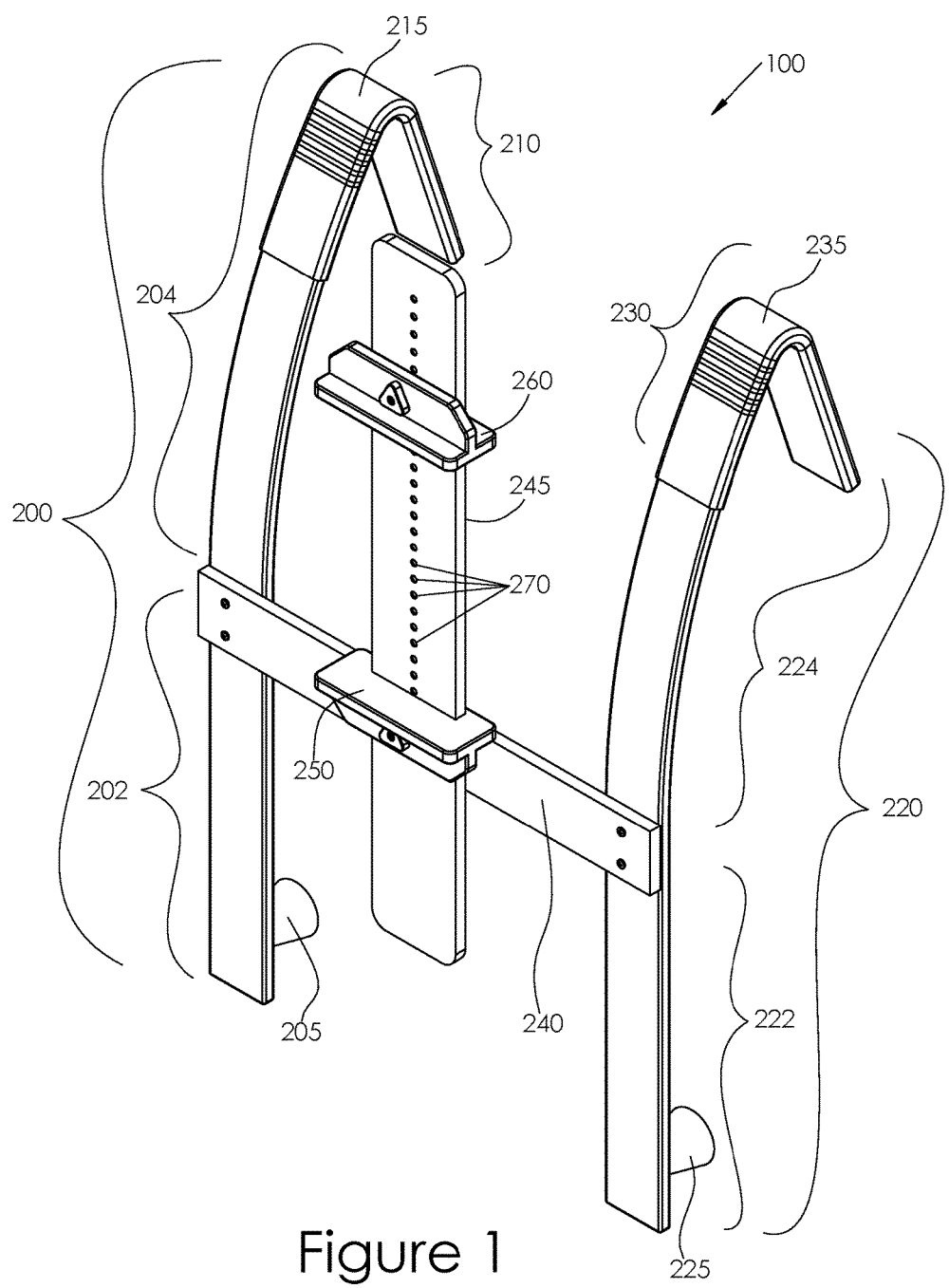
FIG. 1 is a perspective view of an embodiment of the disclosure.
Figure 2:
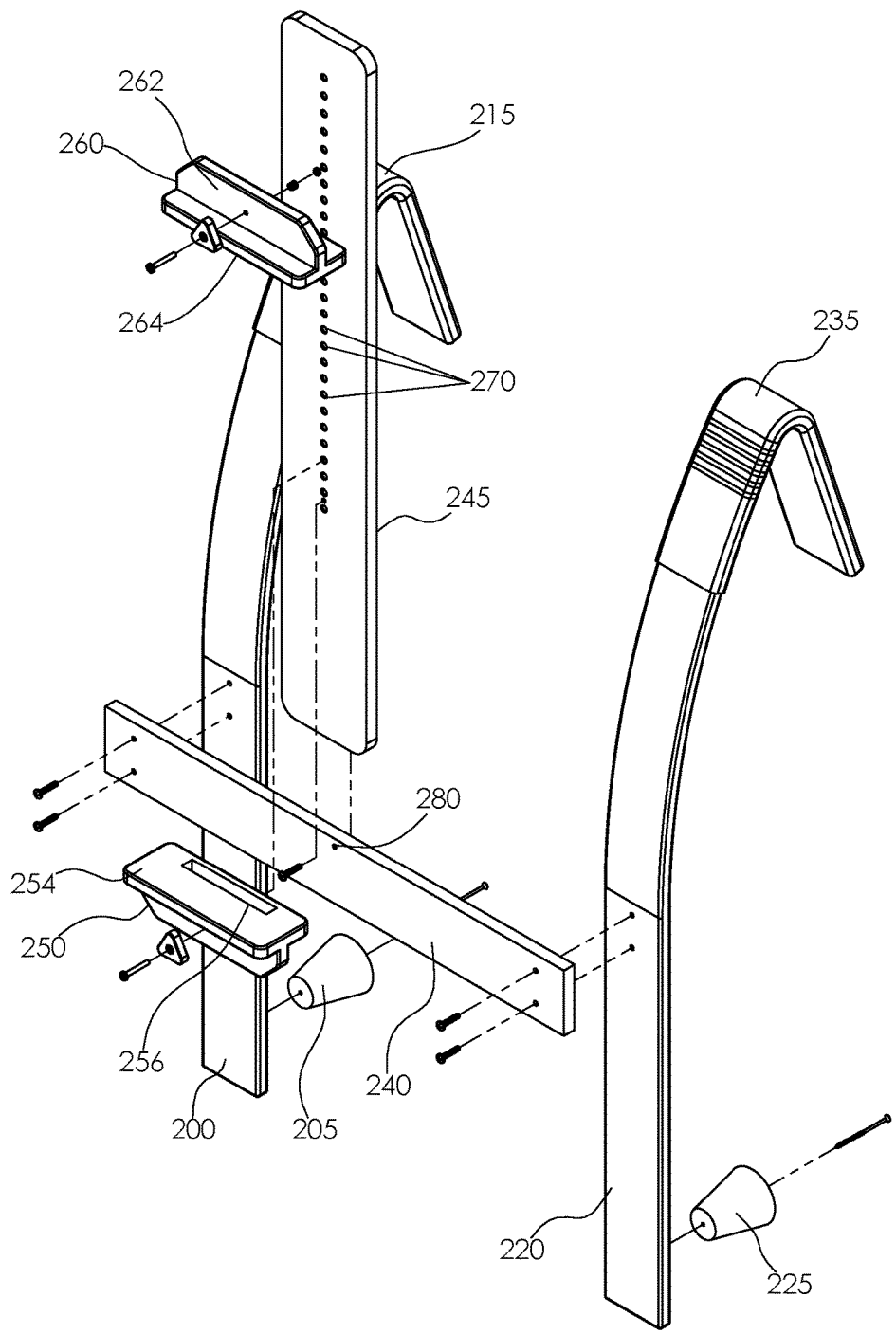
FIG. 2 is an exploded view of an embodiment of the disclosure.
Figure 3:
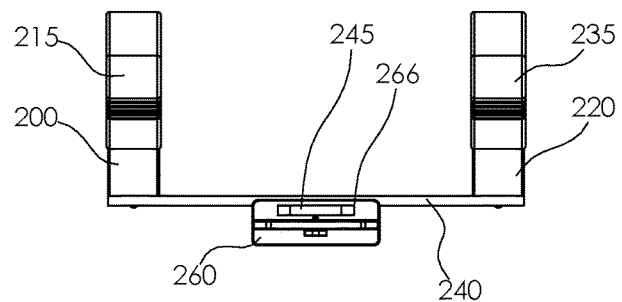
FIG. 3 is a top view of an embodiment of the disclosure.
Figure 4:
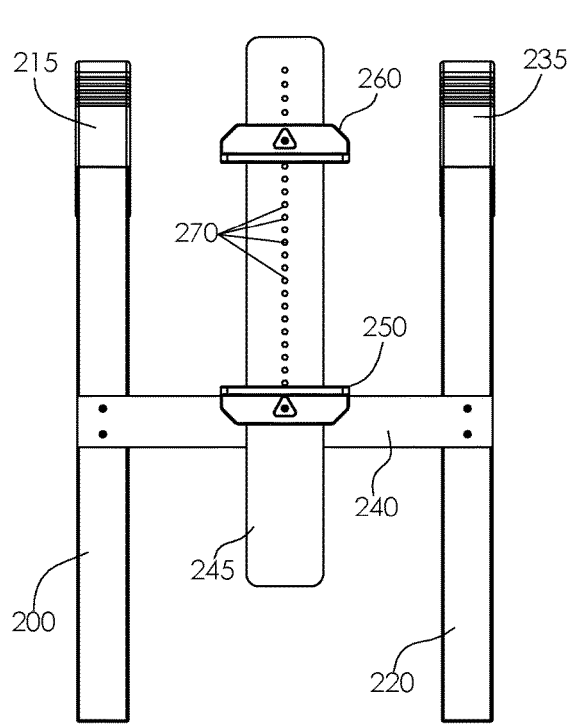
FIG. 4 is a front view of an embodiment of the disclosure.
Figure 5:
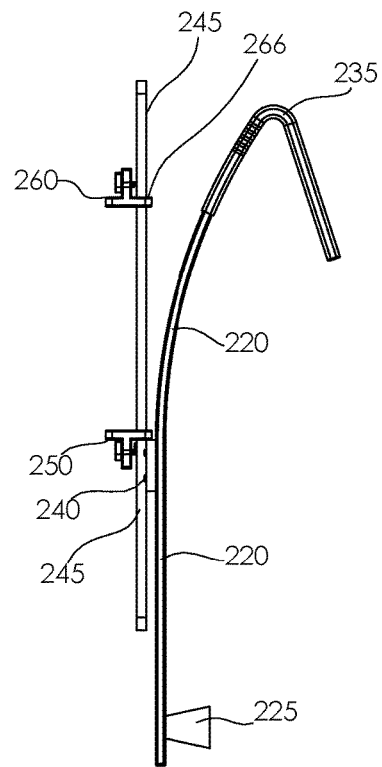
FIG. 5 is a side view of an embodiment of the disclosure.
Figure 6:
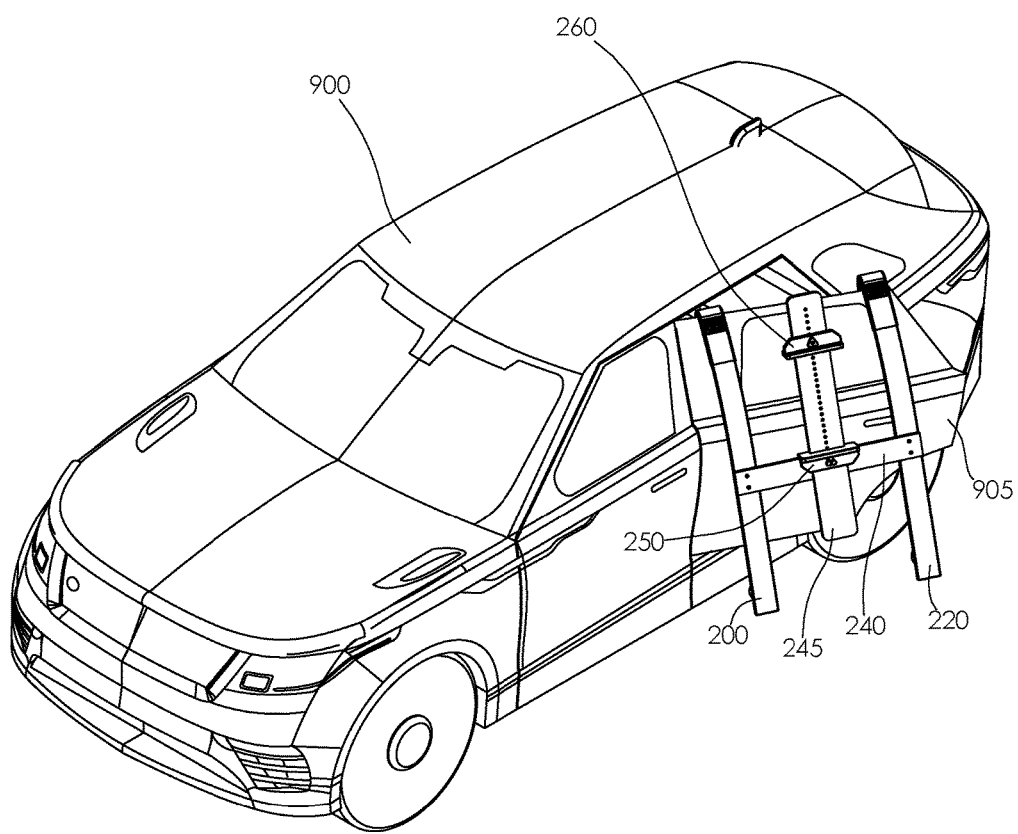
FIG. 6 is an in-use view of an embodiment of the disclosure.

Detailed reference will now be made to a first potential embodiment of the disclosure, which is illustrated in FIGS. 1 through 6.

The vehicle-mounted artist easel 100 (hereinafter invention) comprises a left mounting armature 200, a right mounting armature 220, a cross brace 240, a mast 245, a bottom canvas holder 250, and a top canvas holder 260. The invention 100 may be hung on an open door 905 of a vehicle 900 while the vehicle 900 is stationary. A canvas (not illustrated in the figures) may be clamped to the invention 100. The invention 100 may be adapted to hold the canvas while an artist paints on it.

Throughout this disclosure, the following directional references are used: up and down are defined using a gravitational reference frame where down is the direction that gravity pulls an object and up is the opposite of down. The left mounting armature 200 and the right mounting armature 220 are located at the rear of the invention 100. The bottom canvas holder 250 and the top canvas holder 260 are closest to the front of the invention 100. Left is on the observer's left when standing in front of the invention 100 while looking at the invention 100 and right is the opposite of left.

The left mounting armature 200 may be a vertical component located on the left side of the invention 100. The left mounting armature 200 comprises a left lower portion 202 and a left upper portion 204. The left lower portion 202 may be straight. The left upper portion 204 may be curved towards the rear.

The top of the left mounting armature 200 may bend rearward and downward by at least 90 degrees to form a left hook 210. The left hook 210 may comprise a left hook padding 215 to protect the open door 905 from scratches. The left hook padding 215 may cover the outside surface of the left hook 210. A left bumper 205 may be coupled to the bottom rear of the left lower portion 202 to protect the open door 905 from scratches.

The right mounting armature 220 may be a vertical component located on the right side of the invention 100. The right mounting armature 220 comprises a right lower portion 222 and a right upper portion 224. The right lower portion 222 may be straight. The right upper portion 224 may be curved towards the rear.

The top of the right mounting armature 220 may bend rearward and downward by at least 90 degrees to form a right hook 230. The right hook 230 may comprise a right hook padding 235 to protect the open door 905 from scratches. The right hook padding 235 may cover the outside surface of the right hook 230. A right bumper 225 may be coupled to the bottom rear of the right lower portion 222 to protect the open door 905 from scratches.

The left mounting armature 200 and the right mounting armature 220 may be hangers that couple the invention 100 to the open door 905 of the vehicle 900 on either the inside of the open door 905 or the outside of the open door 905. The invention 100 may hang from the top of the open door 905 via the left hook 210 and the right hook 230. The bottom rear of the invention 100 may rest against the open door 905 on the left bumper 205 and the right bumper 225.

The cross brace 240 may be coupled to the left mounting armature 200 and to the right mounting armature 220. Specifically, the left end of the cross brace 240 may couple to a midpoint of the left mounting armature 200 and the right end of the cross brace 240 may couple to a midpoint the right mounting armature 220. The coupling between the cross brace 240 and the left mounting armature 200 and between the cross brace 240 and the right mounting armature 220 may be nuts, bolts, screws, captive hardware, rivets, welds, adhesives, or combinations thereof.

The cross brace 240 may be oriented horizontally between the left mounting armature 200 and the right mounting armature 220.

The cross brace 240 may comprise one or more cross-brace apertures 280. Mounting hardware may couple the cross brace 240 to the mast 245 via the one or more crossbrace apertures 280 and a plurality of apertures 270 on the mast 245.

The mast 245 may be a vertically oriented, straight armature that is coupled to the center of the cross brace 240. The mast 245 may hold the top canvas holder 260 and the bottom canvas holder 250 on opposing sides of the canvas.

The mast 245 may comprise the plurality of apertures 270 with each of the plurality of apertures 270 running from the front side of the mast 245 to the rear side of the mast 245. The plurality of apertures 270 may be aligned in a straight line running vertically down the center of the mast 245.

The bottom canvas holder 250 and the top canvas holder 260 may be opposing sides of a clamp that holds the canvas onto the invention 100. The top canvas holder 260 may be at a higher position on the mast 245 than the bottom canvas holder 250. The bottom canvas holder 250 and the top canvas holder 260 may couple to the mast 245 using the plurality of apertures 270. The distance between specific apertures selected from the plurality of apertures 270 determines the size of the canvas that may be held. Since the specific apertures used to couple the bottom canvas holder 250 and the top canvas holder 260 to the mast 245 may be chosen from any of the plurality of apertures 270, the invention 100 may be adjusted to hold multiple sizes of the canvas.

The bottom canvas holder 250 may be a horizontal bracket that slidably couples to the mast 245. The bottom canvas holder 250 may comprise a flat upper surface 254 to press against the canvas.

The bottom canvas holder 250 may comprise a bottom holder mounting aperture (not illustrated in the figures) below the flat upper surface 254. The bottom canvas holder 250 may be moved up or down on the mast 245 to change the distance between the bottom canvas holder 250 and the top canvas holder 260. Up and down movement of the bottom canvas holder 250 on the mast 245 may be prevented by coupling the bottom canvas holder 250 to the mast 245. Specifically, the bottom canvas holder 250 may be coupled to the mast 245 using mounting hardware which passes through the bottom holder mounting aperture and the plurality of apertures 270 on the mast 245.

The bottom canvas holder 250 may comprise a bottom mast slot 256. The mast 245 may pass through the bottom mast slot 256 and may prevent movement of the bottom canvas holder 250 to the front, rear, left, and right while allowing movement up and down.

The top canvas holder 260 may be a horizontal bracket that slidably couples to the mast 245. The top canvas holder 260 may comprise a flat lower surface 264 to press against the canvas.

The top canvas holder 260 may comprise a top holder mounting aperture 262 above the flat lower surface 264. The top canvas holder 260 may be moved up or down on the mast 245 to change the distance between the bottom canvas holder 250 and the top canvas holder 260. Up and down movement of the top canvas holder 260 on the mast 245 may be prevented by coupling the top canvas holder 260 to the mast 245. Specifically, the top canvas holder 260 may be coupled to the mast 245 using mounting hardware, which passes through the top holder mounting aperture 262 and the plurality of apertures 270 on the mast 245.

The top canvas holder 260 may comprise a top mast slot 266. The mast 245 may pass through the top mast slot 266 and may prevent movement of the top canvas holder 260 to the front, rear, left, and right while allowing movement up and down.

In some embodiments, the mounting hardware used to coupled the bottom canvas holder 250 and the top canvas holder 260 to the mast 245 may comprise thumb screws and/or wing nuts which may be tightened and loosened by hand without the use of tools.

In use, the vehicle 900 is driven to a scenic location and parked. The invention 100 is hung on the open door 905. The top canvas holder 260 and/or the bottom canvas holder 250 repositioned, if necessary, so that the canvas may rest upon the bottom canvas holder 250 and be held in place by the top canvas holder 260. The canvas is positioned on the bottom canvas holder 250. The top canvas holder 260 is positioned at the top of the canvas and coupled to the mast 245 to hold the canvas in place. The artist may paint a scene using the vehicle 900 as an easel and may then remove the canvas by reversing the installation process. When finished, the invention 100 may be removed from the open door 905 and stowed away.

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" refers to top and "lower" refers to the bottom. As a non-limiting example, the upper end of a vertical shaft is the top end of the vertical shaft.

As used in this disclosure, an "aperture" is an opening in a surface. Aperture may be synonymous with hole, slit, crack, gap, slot, or opening.

As used in this disclosure, a "brace" is a structural element that is used to support or otherwise steady an object.

As used herein, "captive hardware" or "captive fastener" refers to a type of fastener where at least one part of the fastener is retained by one of the parts that the fastener is intended to couple. A captive fastener is often made with thread locking, press-fitting, or broaching to accomplish an anchor-hold within a larger assembly housing. However, a captive fastener may also be melded with the material into which it is joined, either through cold forming or welding. Cage nuts and captive screws are non-limiting examples of captive hardware.

As used herein, the words "couple", "couples", "coupled" or "coupling", refer to connecting, either directly or indirectly, and does not necessarily imply a mechanical connection.

As used in this disclosure, a "hook" is an object that is curved or bent at an angle such that items can be hung on or caught by the object or such that the object may be suspended from another object.

As used in this disclosure, "horizontal" is a directional term that refers to a direction that is perpendicular to the local force of gravity. Unless specifically noted in this disclosure, the horizontal direction is always perpendicular to the vertical direction.

As used here, the word "midpoint" refers to a point near the center of an object. An "exact midpoint" refers to a midpoint that is equidistant from edges of the object in at least one direction. Unless otherwise stated, a midpoint is not required to be at the exact center of the object but instead may be within 20% of the distance from the exact midpoint to the farthest edge.

As used herein, "mounting hardware" refers to mechanical devices that are used to attach one object to another, including devices whose only purpose is to improve aesthetics. As non-limiting examples, mounting hardware may include screws, nuts, bolts, washers, crossbars, hooks, collars, nipples, standoffs, knobs, caps, plates, rails, and brackets.

As used in this disclosure, when used as a noun the term "paint" refers to a pigment based colloid or solution that is applied to a surface as a coating of the surface. When used as a verb, the term paint refers to the application of paint to a surface.

As used in this disclosure, a "slot" is a long narrow groove, cut, opening, or aperture that is formed in or through an object.

As used herein, "thumb screw" and "wing nut" refer to fasteners that are designed to be tightened and loosened by hand without the use of tools. As non-limiting examples, thumb screws and wing nuts may be screws, bolts, or nuts that include any or all of the following features: oversized dimensions, knurled sides, one or more upward extensions, or one or more lateral extensions.

As used in this disclosure, a "vehicle" is a device that is used for transporting passengers, goods, or equipment.

As used in this disclosure, "vertical" refers to a direction that is parallel to the local force of gravity. Unless specifically noted in this disclosure, the vertical direction is always perpendicular to horizontal.

With respect to the above description, it is to be realized that the optimum dimensional relationship for the various components of the invention described above and in FIGS. 1 through 6, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A vehicle-mounted artist easel comprising:
   a left mounting armature, a right mounting armature, a cross brace, a mast, a bottom canvas holder, and a top canvas holder;
   wherein the vehicle-mounted artist easel is hung on an open door of a vehicle while the vehicle is stationary;
   wherein a canvas is clamped to the vehicle-mounted artist easel;
   wherein the vehicle-mounted artist easel is adapted to hold the canvas while an artist paints thereon;
   wherein the left mounting armature is a vertical component located on the left side of the vehicle-mounted artist easel;
   wherein the left mounting armature comprises a left lower portion and a left upper portion;
   wherein the left lower portion is straight;
   wherein the left upper portion is curved towards the rear;
   wherein the bottom canvas holder comprises a bottom mast slot;
   wherein the mast passes through the bottom mast slot and prevents movement of the bottom canvas holder to the front, rear, left, and right while allowing movement up and down.

2. The vehicle-mounted artist easel according to claim 1
   wherein the top of the left mounting armature bends rearward and downward by at least 90 degrees to form a left hook;
   wherein the left hook comprises a left hook padding to protect the open door from scratches;
   wherein the left hook padding covers the outside surface of the left hook;
   wherein a left bumper is coupled to the bottom rear of the left lower portion to protect the open door from scratches.

3. The vehicle-mounted artist easel according to claim 2
   wherein the right mounting armature is a vertical component located on the right side of the vehicle-mounted artist easel;
   wherein the right mounting armature comprises a right lower portion and a right upper portion;
   wherein the right lower portion is straight;
   wherein the right upper portion is curved towards the rear.

4. The vehicle-mounted artist easel according to claim 3
wherein the top of the right mounting armature bends rearward and downward by at least 90 degrees to form a right hook;
wherein the right hook comprises a right hook padding to protect the open door from scratches;
wherein the right hook padding covers the outside surface of the right hook;
wherein a right bumper is coupled to the bottom rear of the right lower portion to protect the open door from scratches.

5. The vehicle-mounted artist easel according to claim 4
wherein the left mounting armature and the right mounting armature are hangers that couple the vehicle-mounted artist easel to the open door of the vehicle on either the inside of the open door or the outside of the open door;
wherein the vehicle-mounted artist easel hangs from the top of the open door via the left hook and the right hook;
wherein the bottom rear of the vehicle-mounted artist easel rests against the open door on the left bumper and the right bumper.

6. The vehicle-mounted artist easel according to claim 5
wherein the cross brace is coupled to the left mounting armature and to the right mounting armature;
wherein the left end of the cross brace couples to a midpoint of the left mounting armature and the right end of the cross brace couples to a midpoint the right mounting armature;
wherein the coupling between the cross brace and the left mounting armature and between the cross brace and the right mounting armature comprises nuts, bolts, screws, captive hardware, rivets, welds, adhesives, or combinations thereof.

7. The vehicle-mounted artist easel according to claim 6
wherein the cross brace is oriented horizontally between the left mounting armature and the right mounting armature.

8. The vehicle-mounted artist easel according to claim 7
wherein the cross brace comprises one or more crossbrace apertures;
wherein mounting hardware couples the cross brace to the mast via the one or more crossbrace apertures and a plurality of apertures on the mast.

9. The vehicle-mounted artist easel according to claim 8
wherein the mast is a vertically oriented, straight armature that is coupled to the center of the cross brace;
wherein the mast holds the top canvas holder and the bottom canvas holder on opposing sides of the canvas.

10. The vehicle-mounted artist easel according to claim 9
wherein the mast comprises the plurality of apertures with each of the plurality of apertures running from the front side of the mast to the rear side of the mast;
wherein the plurality of apertures are aligned in a straight line running vertically down the center of the mast.

11. The vehicle-mounted artist easel according to claim 10
wherein the bottom canvas holder and the top canvas holder are opposing sides of a clamp that holds the canvas onto the vehicle-mounted artist easel;
wherein the top canvas holder is at a higher position on the mast than the bottom canvas holder;
wherein the bottom canvas holder and the top canvas holder couple to the mast using the plurality of apertures;
wherein the distance between specific apertures selected from the plurality of apertures determines the size of the canvas that is held;
wherein the vehicle-mounted artist easel is adjusted to hold multiple sizes of the canvas by choosing the specific apertures used to couple the bottom canvas holder and the top canvas holder to the mast from any of the plurality of apertures.

12. The vehicle-mounted artist easel according to claim 11
wherein the bottom canvas holder is a horizontal bracket that slidably couples to the mast;
wherein the bottom canvas holder comprises a flat upper surface to press against the canvas.

13. The vehicle-mounted artist easel according to claim 12
wherein the bottom canvas holder comprises a bottom holder mounting aperture below the flat upper surface;
wherein the bottom canvas holder is moved up or down on the mast to change the distance between the bottom canvas holder and the top canvas holder;
wherein up and down movement of the bottom canvas holder on the mast is prevented by coupling the bottom canvas holder to the mast;
wherein the bottom canvas holder is coupled to the mast using mounting hardware which passes through the bottom holder mounting aperture and the plurality of apertures on the mast.

14. The vehicle-mounted artist easel according to claim 13
wherein the top canvas holder is a horizontal bracket that slidably couples to the mast;
wherein the top canvas holder comprises a flat lower surface to press against the canvas.

15. The vehicle-mounted artist easel according to claim 14 wherein the top canvas holder comprises a top holder mounting aperture above the flat lower surface;
wherein the top canvas holder is moved up or down on the mast to change the distance between the bottom canvas holder and the top canvas holder;
wherein up and down movement of the top canvas holder on the mast is prevented by coupling the top canvas holder to the mast;
wherein the top canvas holder is coupled to the mast using mounting hardware which passes through the top holder mounting aperture and the plurality of apertures on the mast.

16. The vehicle-mounted artist easel according to claim 15
wherein the top canvas holder comprises a top mast slot;
wherein the mast passes through the top mast slot and prevents movement of the top canvas holder to the front, rear, left, and right while allowing movement up and down.

17. The vehicle-mounted artist easel according to claim 16
wherein the mounting hardware used to coupled the bottom canvas holder and the top canvas holder to the mast comprises thumb screws and/or wing nuts which is tightened and loosened by hand without the use of tools.

* * * * *